(12) United States Patent
Morita et al.

(10) Patent No.: US 7,678,493 B2
(45) Date of Patent: Mar. 16, 2010

(54) BATTERY PACK

(75) Inventors: Hideyo Morita, Mihara-gun (JP); Katsuji Mizuta, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 1157 days.

(21) Appl. No.: 10/909,345

(22) Filed: Aug. 3, 2004

(65) Prior Publication Data
US 2005/0031945 A1   Feb. 10, 2005

(30) Foreign Application Priority Data
Aug. 5, 2003 (JP) .............................. 2003-287218

(51) Int. Cl.
*H01M 2/10* (2006.01)
(52) U.S. Cl. .............................. 429/96; 429/97; 429/99; 429/100
(58) Field of Classification Search .................. 429/96, 429/99
See application file for complete search history.

(56) References Cited

U.S. PATENT DOCUMENTS

| | | | | |
|---|---|---|---|---|
| 5,197,889 A | * | 3/1993 | Rizzo et al. ................. | 439/76.1 |
| 5,551,883 A | * | 9/1996 | Davis .......................... | 439/65 |
| 5,879,833 A | * | 3/1999 | Yoshii et al. ................ | 429/62 |
| 6,465,123 B1 | * | 10/2002 | Baumann et al. ............. | 429/99 |
| 2002/0079865 A1 | * | 6/2002 | Thomas et al. .............. | 320/136 |
| 2003/0082439 A1 | * | 5/2003 | Sakakibara ................... | 429/120 |

FOREIGN PATENT DOCUMENTS

| | | | |
|---|---|---|---|
| JP | 09159796 | * | 6/1997 |
| JP | 10-308205 | | 11/1998 |

* cited by examiner

*Primary Examiner*—Dah-Wei D Yuan
*Assistant Examiner*—Steven Scully
(74) *Attorney, Agent, or Firm*—Wenderoth, Lind & Ponack, L.L.P.

(57) ABSTRACT

A battery pack provided with a battery block (3), a case (2), and a circuit board (4). The battery block (3) has a plurality of batteries (1) lined up in a horizontal row with the same orientation, and lead plates (5) connect to terminals of those batteries (1) to form a parallel unit (6). A plurality of parallel units (6) are stacked in the vertical direction with a different orientation, and battery terminals are connected by lead plates (5) in the vertical direction to connect parallel units (6) in series. Lead plates (5) have projections (10) which protrude horizontally beyond the confines of the battery block (3) and connect with the circuit board (4), and the battery block (3) and circuit board (4) are connected as a unit.

18 Claims, 9 Drawing Sheets

BATTERY PACK

BACKGROUND OF THE INVENTION

This invention relates primarily to a battery pack suitable for high current discharges, and in particular to a battery pack with a plurality of batteries connected in series and parallel.

Battery pack output current can be increased by increasing the number of batteries connected in parallel, and battery pack output voltage can be increased by increasing the number of batteries connected in series. From this, battery packs used in applications requiring large output, such as bicycles, tools, and automobiles, can increase output by connecting a plurality of batteries in parallel, and again connecting those units in series. Since many batteries are housed in this type of battery pack, a configuration which allows efficient connection of each battery is important. As an implementation of this, a battery pack has been developed with batteries connected by a uniquely structured lead plate (see Japanese patent application HEI 10-308205).

Figure 1:
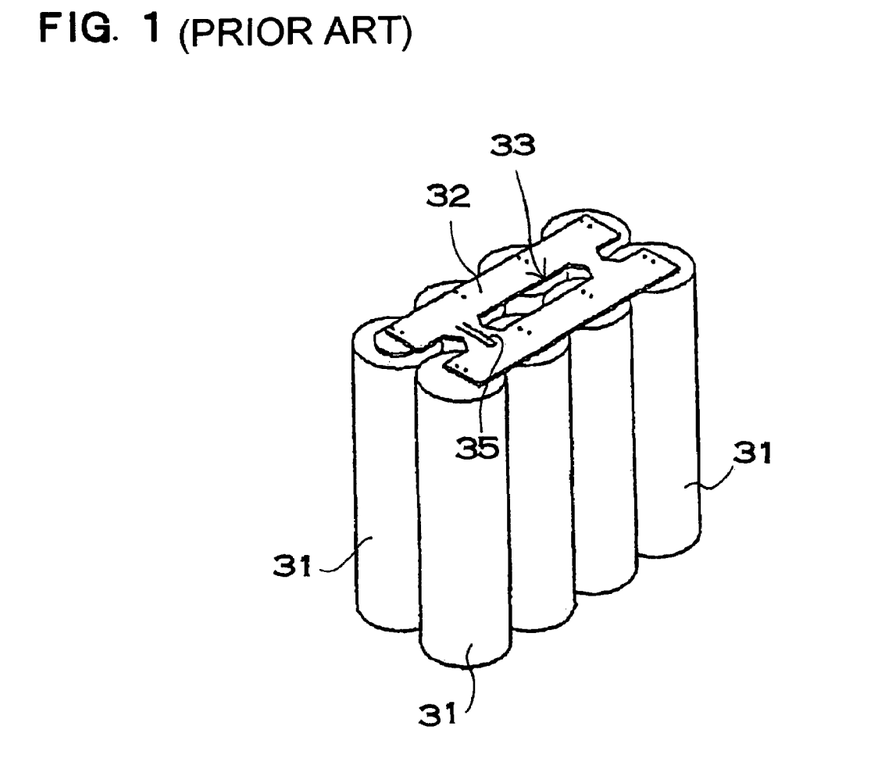
FIG. 1 is a perspective view showing batteries connected to a lead plate in a prior art battery pack.
Figure 2:
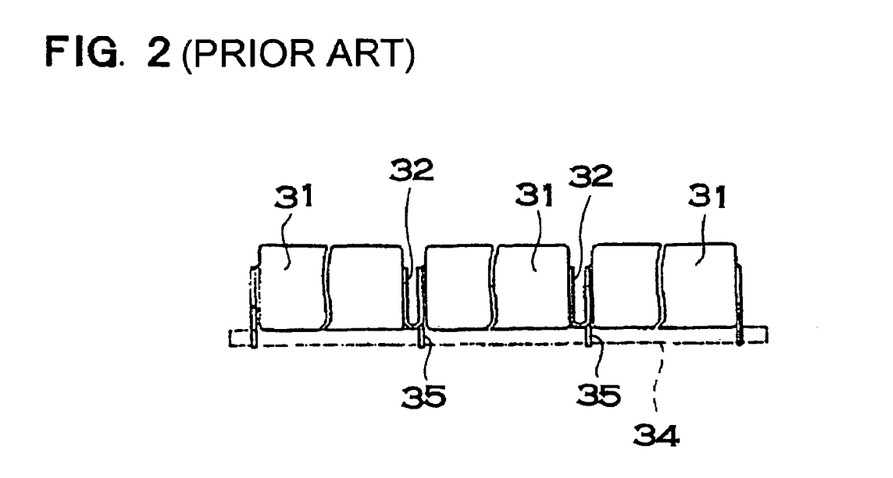
FIG. 2 is a side view showing the lead plate shown in FIG. 1 bent in two.

As shown in FIG. 1, the battery pack cited in this disclosure has a lead plate 32 spot welded to connect the end-planes of two rows of batteries 31 lined up side by side. The lead plate 32 is provided with a slit 33 along its center line to allow it to smoothly bend along the center line. Further, interconnect wiring projections 35 are provided along the center of the lead plate 32 to project outward for connection to circuit board 34 when the lead plate 32 is bent along the slit 33. When this lead plate 32 is bent back 180° along the slit 33, the interconnect wiring projections 35 protrude outward as shown in FIG. 2. The protruding interconnect wiring projections 35 are connected to the circuit board thereby joining the batteries 31 to the circuit board.

In the battery pack arrangement shown in FIGS. 1 and 2, lead plate electrical resistance in series with parallel connected batteries becomes significant. This is because openings, such as the slit provided at the center region of the lead plate to make it easy to bend, are connected in series. In a high output battery pack, it is important to reduce electrical resistance as much as possible. This is because high currents result in large losses even with extremely small electrical resistance, and consequently this limits maximum output.

The battery pack shown in FIGS. 1 and 2 has the further drawback that since lead plates connected to the terminals of all the batteries are bent 180° and connected to the circuit board, lead plates and batteries can easily become disconnected during lead plate bending. In addition, a lead plate may not be completely disconnected from a battery, but may be in a tenuous connection and may easily become disconnected causing failure during use. Another troubling drawback is due to the narrow space for the lead plate between opposing battery end-planes. This makes it difficult to confirm lead plate to battery connections and makes it extremely difficult to reconnect lead plates disconnected from battery terminals.

Further, in this battery pack configuration, as the number of parallel connected batteries is increased, the size of the circuit board must be increased. Therefore, this battery pack has the drawback that a design change, which changes the number of batteries, cannot be easily accommodated.

The present invention was developed with the object of avoiding the drawbacks described above. Thus, it is the primary object of the present invention to provide a battery pack which allows connection of a large number of batteries in an extremely low resistance configuration, allows a reliable connection of lead plates to batteries in a manner that will not disconnect, allows easy confirmation of lead plate to battery connection region integrity and efficient lead plate to battery connection, and allows easy accommodation of design changes which change the number of batteries to optimize battery pack configuration for the application.

The above and further objects and features of the invention will more fully be apparent from the following detailed description with accompanying drawings.

SUMMARY OF THE INVENTION

The battery pack of the present invention is provided with a battery block which is an array of a plurality of batteries arranged vertically and horizontally in close proximity and perpendicular to a specified plane of a case, which houses the battery block, and a circuit board which is connected to the batteries. The battery block has parallel units of batteries which are a plurality of batteries lined up in horizontal rows with the same orientation and connected in parallel by lead plates connected to terminals of the same polarity. Further, the battery block has a plurality of parallel units arranged vertically to make battery orientation different in the vertical direction. Lead plates which connect a plurality of parallel units of batteries in parallel also connect to battery terminals of parallel units that are adjacent in the vertical direction. This connects a plurality of parallel units in series. In addition, these lead plates have projections that protrude from the battery block in the horizontal direction and are connected to the circuit board. The circuit board is disposed opposite a side of the battery block to allow connection with a plurality of lead plate projections. Lead plate projections are connected to the circuit board to join the battery block and the circuit board as a single unit.

The battery pack described above has the characteristic that a plurality of batteries can be connected in an extremely low resistance configuration. This is because lead plates are connected to a plurality of battery terminals to form parallel units, and a plurality of parallel units is also connected in series by these lead plates. In particular, the battery pack connects a plurality of battery terminals together with a single lead plate to connect those batteries in parallel and in series. The lead plates of a battery pack of this structure do not bend in two as in the prior art battery packs. Instead, batteries connected in parallel can be connected in series by wide lead plates. Consequently, a plurality of batteries can be connected in a low resistance series configuration without reducing the resistivity of the series connected region.

Since the battery pack described above does not bend lead plates in two as in prior art battery packs but rather connects a plurality of batteries in parallel and series with a single lead plate, disconnection of a lead plate from a battery terminal during manufacture is effectively prevented. Consequently, the battery pack has the characteristic that lead plates can be joined to batteries in a manner that will not disconnect. In addition, lead plate to battery connection regions can be easily checked, and lead plates and batteries can be efficiently connected in this battery pack.

Further, the battery pack described above has the characteristic that design changes, which change the number of batteries, are easily accommodated, and the configuration can be optimized for the application. This is because lead plates can be changed to various lengths in the lateral (horizontal) direction, and the number of batteries connected in parallel can be adjusted. Therefore, the battery pack of the present invention can ideally connect the optimum number of batteries in parallel for various applications without changing the size of the circuit board.

Horseshoe shaped slits are provided in the battery terminal connecting region of a lead plate, and battery terminals can be spot welded inside the horseshoe shaped slits. Further, the width of the terminal connecting region of a lead plate can be made approximately equal to the vertical height of two rows of adjacent parallel units. The circuit board can be provided with voltage detection circuitry to detect parallel unit voltage.

Finally, the battery pack of the present invention can be provided with intervening spacers disposed in the horizontal direction between adjacent parallel units, and with alignment plates disposed in the vertical direction. The battery pack can be mechanically stabilized by joining spacers and alignment plates.

DETAILED DESCRIPTION OF THE INVENTION

Figure 3:
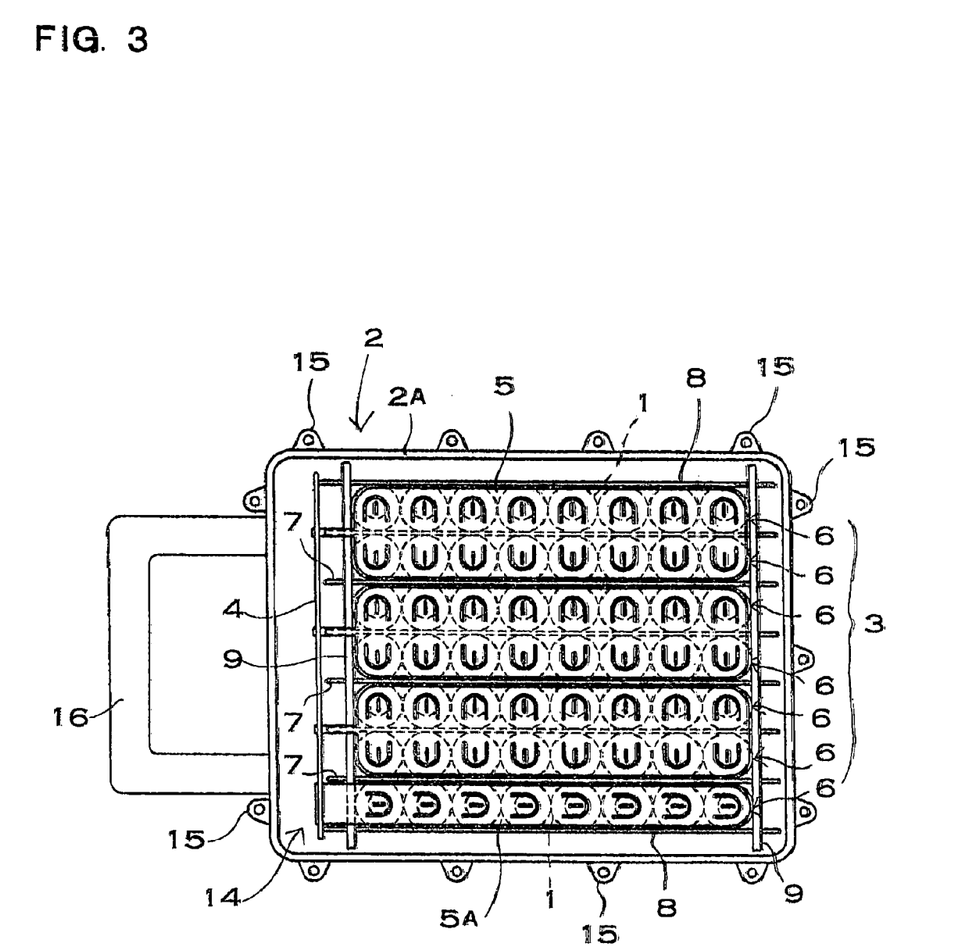
FIG. 3 is a cross-sectional view showing the internal structure of a battery pack of one embodiment of the present invention.

The battery pack shown in FIG. 3 is provided with a battery block 3 which is a plurality of batteries 1 arranged vertically and horizontally in mutual proximity and oriented perpendicular to a specified plane of a case 2 (a plane parallel to the paper in FIG. 3). The case 2 houses the battery block 3, and a circuit board 4 is connected with the batteries 1.

Figure 4:
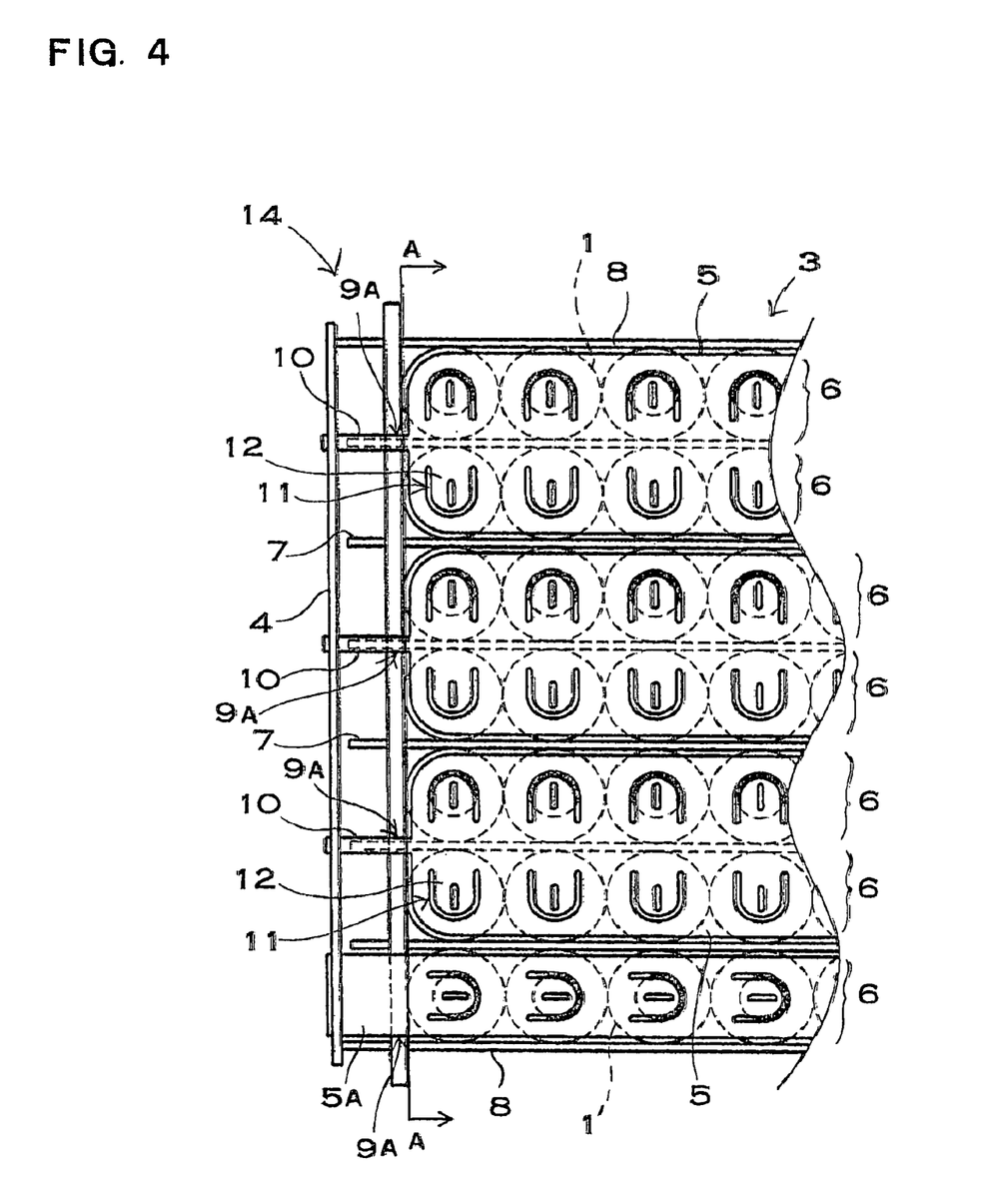
FIG. 4 is an enlarged view showing the connecting structure between the battery block and circuit board of the battery pack shown in FIG. 3.
Figure 5:
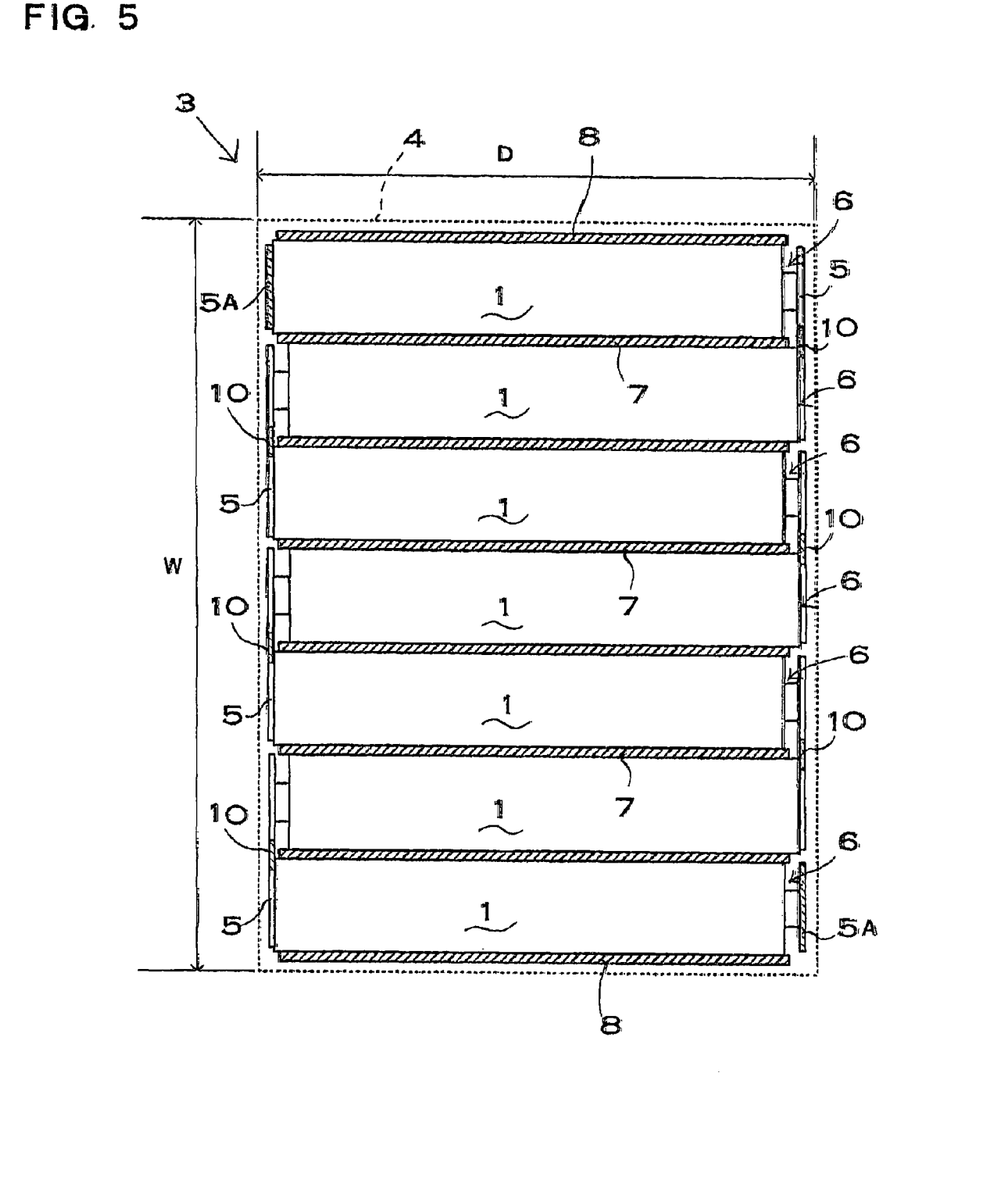
FIG. 5 is a cross-sectional view taken along the A-A line of FIG. 4 showing the connecting structure between parallel units and lead plates of the battery block shown in FIG. 4.

The batteries 1 of the battery block 3 are lined up in a horizontal row (left-right direction in FIG. 3) and are aligned in the same orientation. In addition, lead plates 5 are connected to the terminals of batteries 1 to connect a plurality of batteries 1 in parallel and form parallel units 6. Further, as shown in FIGS. 3-5, a plurality of parallel units 6 are arranged in the vertical direction (up-down direction in the figures) of the battery block 3 with different orientations. Finally, as shown in FIG. 5, battery terminals of vertically adjacent parallel units 6 are connected to lead plates 5 to connect a plurality of parallel units 6 in series in the vertical direction of the battery block 3. As shown in FIG. 5, the plurality of batteries 1 of the battery block 3 are disposed with both terminal end-planes aligned in common planes. This is for the purpose of connecting adjacent batteries 1 with a lead plate having a planar terminal connecting surface.

The batteries 1 of the battery block 3 are rechargeable secondary batteries. The batteries 1 in the figures are shown to be cylindrical batteries. However, rectangular or thin outline batteries may also be used. The batteries 1 are lithium ion batteries. Lithium ion rechargeable batteries are suitable for a battery pack which connects a plurality of batteries in parallel and again connects those in series. This is because a plurality of lithium ion batteries can be connected in parallel to reduce internal resistance and increase output current. In addition, since the charge capacity of lithium ion batteries is high, they are capable of high currents and can increase output capacity. However, the battery pack of the present invention is not limited to the use of lithium ion batteries, and nickel hydrogen batteries, as well as nickel cadmium batteries, may also be used.

In the battery block 3 shown in FIGS. 3 and 4, a plurality of batteries 1 are arranged vertically and horizontally in close proximity in a manner that positions batteries 1 at intersections of a rectangular lattice structure. Further, intervening spacers 7 are disposed between adjacent parallel units 6 of the battery block 3. Spacers 7 are insulating material that is sandwiched between parallel units 6 and serves to insulate the batteries 1 of adjacent parallel units.

Although not illustrated, the plurality of batteries of the battery block may also be arranged in a manner resembling a closely packed pile of logs rather than being positioned at intersections of a rectangular lattice structure. Namely, vertically stacked rows of batteries may be disposed with the outwardly curved surfaces of the batteries of one row positioned in the valleys between batteries of an adjacent row. In a battery block array of this configuration, spacers disposed between rows of adjacent parallel units can be corrugated or saw-tooth shaped board material, or insulating sheet material. A configuration which arranges batteries in a manner resembling a closely packed pile of logs has the characteristic that many batteries can be arranged in a small space.

In the battery block 3 of FIG. 3, eight batteries 1 are lined up horizontally and seven batteries 1 are stacked vertically resulting in a vertical and horizontal array of 56 batteries altogether. Eight batteries 1 lined up in one horizontal row are connected in parallel to form a parallel unit 6, and seven parallel units stacked in the vertical direction are connected in series. Since batteries 1 lined up horizontally are connected in parallel, the number of parallel connected batteries 1 can be increased by increasing the number of batteries 1 lined up horizontally. By increasing the number of batteries 1 connected in parallel, battery pack internal resistance can be decreased and maximum output current can be increased. Further, since batteries 1 stacked vertically are connected in series, the number of series-connected batteries 1 can be increased by increasing the number of batteries 1 stacked vertically. By increasing the number of batteries 1 connected in series, battery pack output voltage can be increased to increase maximum output.

In the battery block 3 shown in FIG. 5, the right ends of the batteries 1 of the parallel unit 6, disposed in the top row of the figure, are connected via a lead plate 5 with the right ends of batteries 1 of the parallel unit 6 disposed in the second row from the top to connect those vertically adjacent parallel units 6 in series. Further, the left ends of the batteries of the parallel unit 6 disposed in the second row from the top are connected via a lead plate 5 with the left ends of the batteries of the parallel unit 6 disposed in the third row from the top to connect those parallel units 6 in series. Parallel units 6 in lower rows are connected via lead plates 5 in the same manner down to the bottom row to connect a plurality of parallel units 6 in series. Finally, output lead plates 5A are connected to the left end of the parallel unit in the top row and the right end of the parallel unit in the bottom row.

Figure 6:
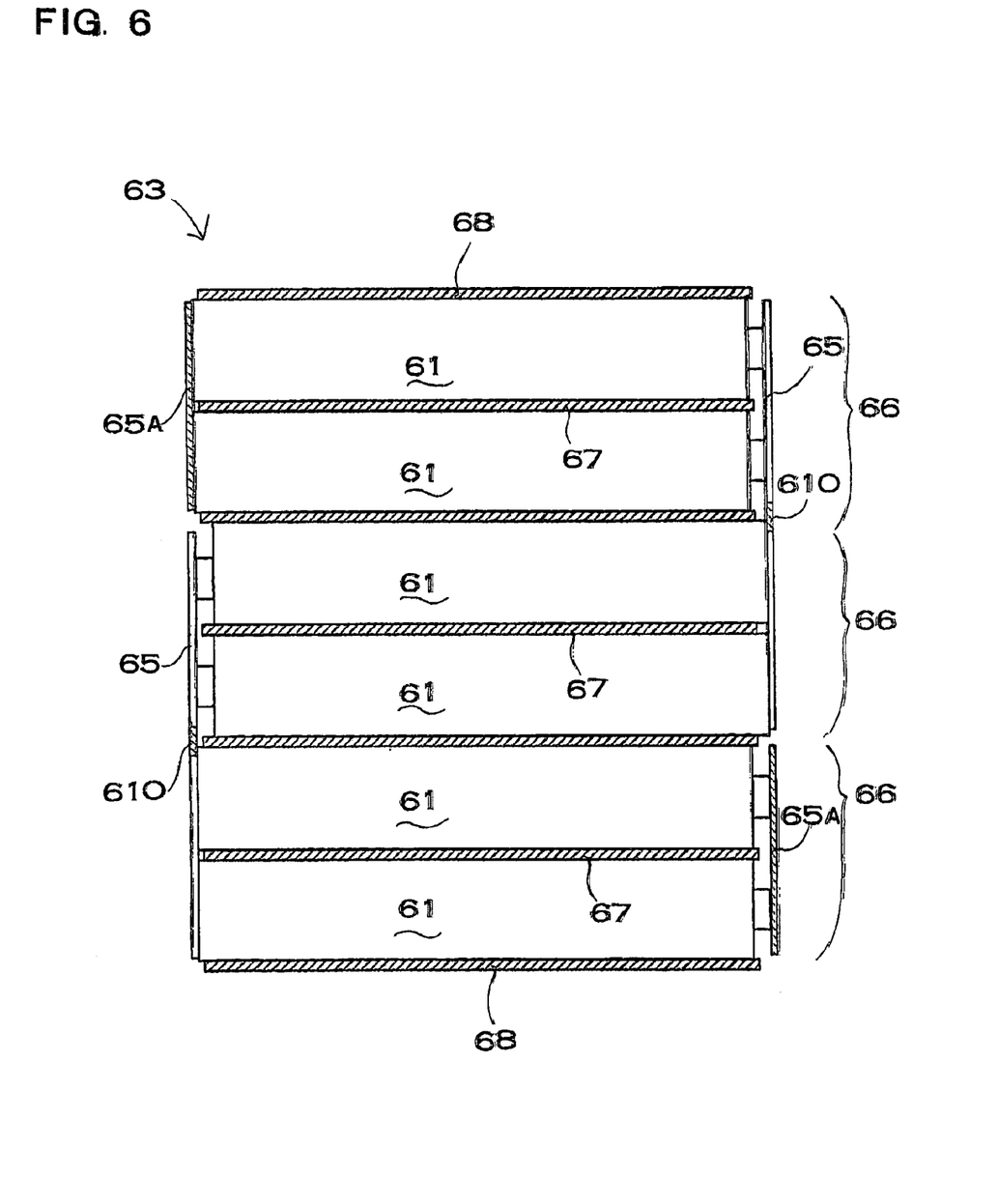
FIG. 6 is a cross-sectional view showing the connecting structure between parallel units and lead plates of a battery pack constructed in accordance with another embodiment of the present invention.

The battery block 3 shown in FIGS. 3-5 is configured with one horizontal row of batteries 1 comprising one parallel unit 6. However, in the battery pack of the present invention, a single parallel unit can also be made up of a plurality of rows of batteries. In the battery block 63 shown in FIG. 6, a plurality of batteries 61 are disposed horizontally in rows of two, and parallel units 66 are made up of those two rows of batteries 61. In FIG. 6, structural elements which are the same as the embodiment shown in FIGS. 3-5, are labeled with the same part designator except for the highest order digit, and their description is abbreviated. At the battery end-planes of these parallel units 66, terminals of two vertically adjacent rows of batteries 61 are connected in parallel via lead plates 65. Further, the plurality of parallel units 66 disposed in the vertical direction are connected in series via the lead plates 65. In this type of array, the number of batteries 61 connected in parallel can be doubled. Consequently, this configuration can further increase the number of batteries 61 in parallel, further reduce internal resistance, and further increase maximum output current. Although not illustrated, parallel units may also be configured as three or more horizontal rows of batteries.

In a battery block 3, the number of batteries 1 lined up horizontally can be, for example 2 to 20, and preferably 4 to 15. The number of batteries 1 stacked vertically can be, for example 2 to 30, and preferably 4 to 20. In a battery block 3 as shown in FIG. 3, in which batteries 1 lined up in a single horizontal row comprise one parallel unit 6, the number of batteries 1 lined up horizontally is the number of batteries 1 connected in parallel, and the number of batteries 1 stacked vertically is the number of parallel units 6 connected in series. In a battery block 63 as shown in FIG. 6, in which batteries 61 lined up in two horizontal rows comprise one parallel unit 66, twice the number of batteries 1 lined up horizontally is the number of batteries 1 connected in parallel, and half the number of batteries 1 stacked vertically is the number of parallel units 6 connected in series.

Spacers 7, which are insulating material, are rectangular plastic boards of hard or soft plastic formed in a planar fashion. Spacers 7 which are planar plastic boards can accurately align a plurality of batteries 1 in an array. In particular, hard plastic spacers have the characteristic that they can accurately arrange circular cylindrical batteries in straight lines. Soft plastic spacers are characterized by excellent shock absorption and firm retention of the curved surfaces of circular cylindrical batteries. A configuration which disposes planar spacers 7 between adjacent parallel units 6 can minimize the contact area of vertically adjacent parallel unit 6 batteries 1 and spacers 7. Consequently, this configuration has the characteristic that heat conduction between parallel units 6 can effectively be abated. However, spacers do not necessarily have to be planar, and spacer surfaces may also have depressions and protrusions. A non-planar spacer has the characteristic that curved surfaces of circular cylindrical batteries can fit in depressions provided in the surface of the spacer and allow arrangement of a plurality of circular cylindrical batteries in accurate alignment.

In addition, spacers 7 which are rectangular plastic boards, have an overall length that is slightly longer than the overall length of parallel units 6 comprising a plurality of batteries 1 lined up horizontally. Alignment plates 9 are joined to end regions of the spacers 7 which protrude beyond both ends of the parallel units 6. Alignment plates 9 are disposed at both lateral end planes of the battery block 3. The alignment plates 9 are disposed at both the right and left ends of the battery block 3 in a manner contacting the batteries 1 at the very ends. The spacers 7 and alignment plates 9 are joined in a mutually intersecting fashion. The alignment plates 9 can also be rectangular plastic boards.

Figure 7:
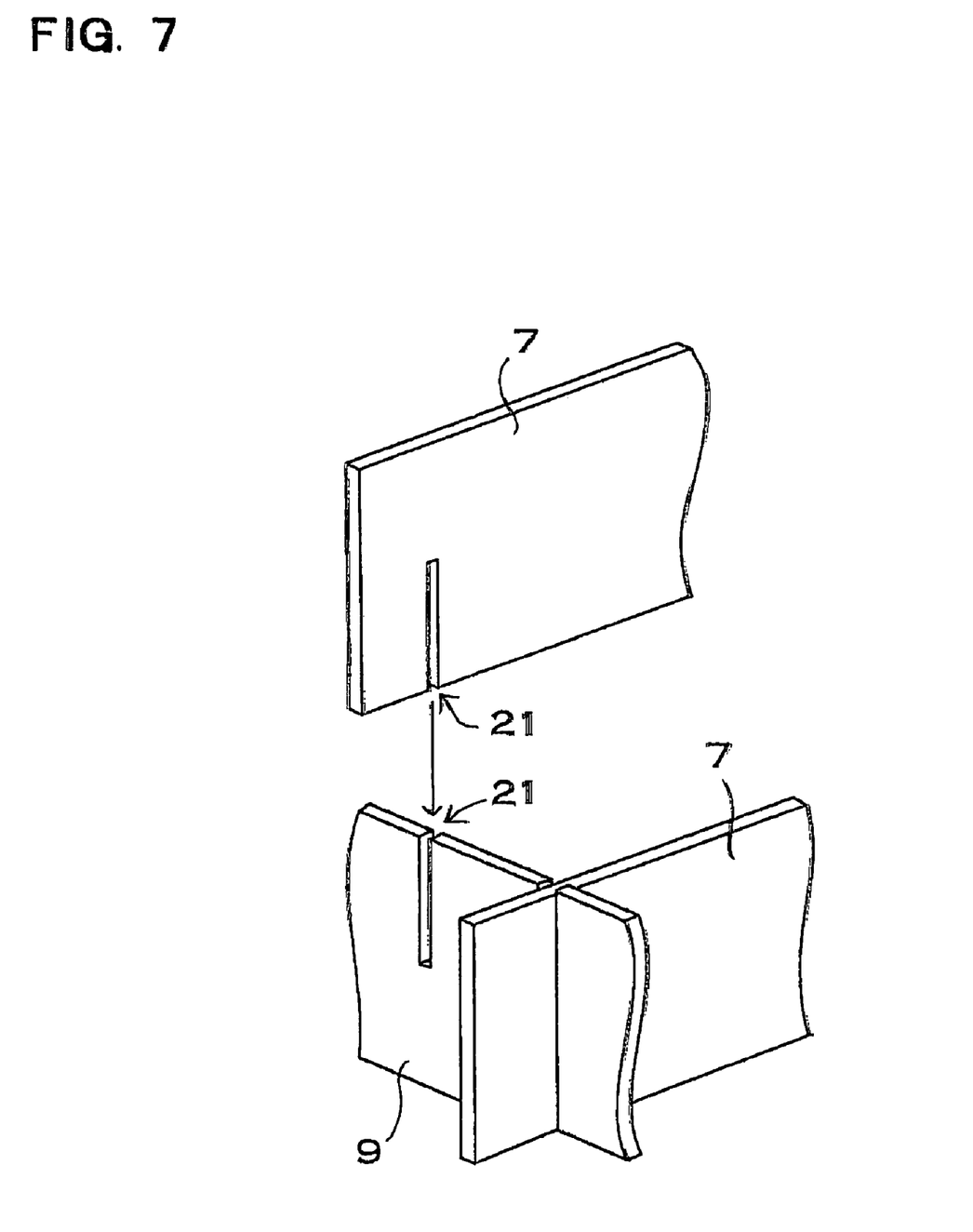
FIG. 7 is an exploded perspective view showing one example of spacer and alignment plate connecting structure.

Spacers 7 and alignment plates 9 can be joined as shown in FIG. 7 by providing coupling slits 21 in their mutual connecting regions. The spacers 7 and alignment plate 9 of FIG. 7 have coupling slits 21 opened in the direction of the battery axes extending from one edge towards the center. The spacers 7 are provided with coupling slits 21 at both end regions. Alignment plates 9 are provided with a plurality of coupling slits 21 at equal intervals to allow connection of a plurality of spacers 7. Coupling slits 21 are opened with a width approximately equal to the thickness of the spacers 7 or alignment plates 9 which will be inserted therein. Spacers 7 and alignment plates 9 are joined in an intersecting fashion by sliding mutually opposing coupling slits 21 together. This coupling structure has the characteristic that spacers 7 and alignment plates 9 can be easily joined at specified locations. Further, spacers 7 and alignment plates 9 joined by coupling slits 21 may be provided with locking hooks and latches in their corresponding connecting regions to join them in a locking configuration. Spacers 7 and alignment plates 9 may also be bonded or welded to fix them together. Although not illustrated, spacers 7 may also be provided with a plurality of coupling slits 21 at specified intervals. Even in the case of various changes in the number of batteries per parallel unit, spacers of this type have the characteristic that they can adapt to the length of the parallel units and alignment plates can be joined at optimum locations.

Figure 8:
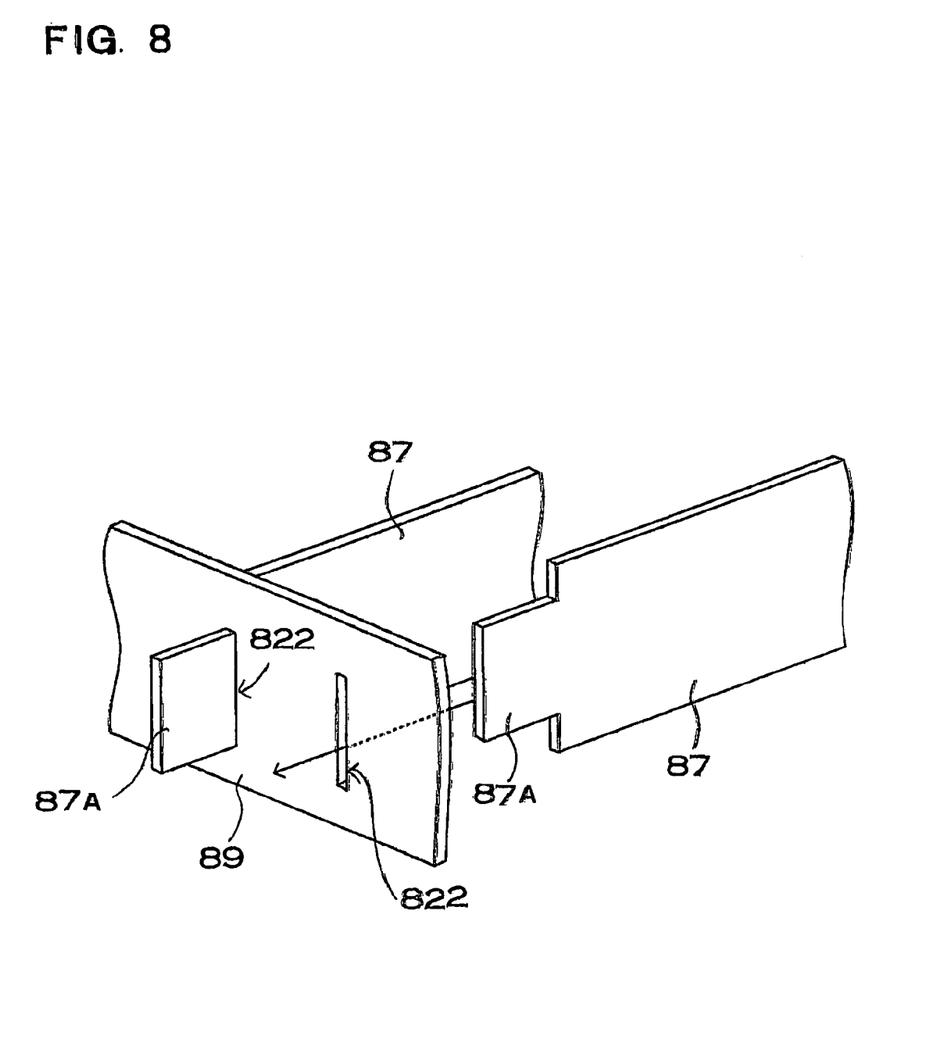
FIG. 8 is an exploded perspective view showing another example of spacer and alignment plate connecting structure.

In addition, spacers and alignment plates can be joined in a structure which passes the end of one through the other. The spacers 87 shown in FIG. 8 are provided with narrowed end sections and projecting regions 87A. These projecting regions 87A insert into insertion slits 822 provided through the center sections of alignment plates 89 to join spacers 87 and alignment plates 89 in a mutually intersecting fashion. Alignment plates 89 are provided with a plurality of insertion slits 822 at equal intervals to allow connection of a plurality of spacers 87. Insertion slits 822 shown in FIG. 8 are opened through an alignment plate 89 extending in the direction of battery 81 axes. Although not illustrated, projecting regions 87A inserted in insertion slits 822 are joined in a manner that will not separate by a locking structure, bonding, or welding. Further, spacers and alignment plates can also be joined by a configuration opposite that shown in FIG. 8. Namely, insertion slits can be opened in both end sections of each spacer and alignment plates, which are narrowed overall, can be inserted through those insertion slits to join the spacers and alignment plates. In this connecting structure, a plurality of spacers is slid onto an alignment plate in a manner similar to a skewer. In addition, spacers joined in this arrangement may also be provided with a plurality of insertion slits at prescribed intervals. Even in the case of various changes in the number of batteries per parallel unit, spacers of this type have the characteristic that they can adapt to the length of the parallel units and alignment plates can be inserted and joined at optimum locations.

Further, the battery block 3 of FIG. 3 has retaining plates 8 disposed at both end surfaces in the vertical direction. The retaining plates 8 shown in FIG. 8 are disposed on the upper surface of the parallel unit 6 of the top row and on the lower surface of the parallel unit 6 of the bottom row. The two retaining plates 8 are disposed in contact with the upper and lower surfaces of batteries 1 in the top and bottom rows of the battery block 3, their end sections are joined with alignment plates 9, and they retain a plurality of parallel units 6 in specified positions in a sandwiched configuration. The previously described spacers 7, 87 can be used as the retaining plates 8. In addition, the connecting structure for the retaining plates 8 and alignment plates 9 can be the same as the connecting structure for spacers 7, 87 and alignment plates 9, 89.

As described above, the battery block 3 is held together by retaining plates 9 disposed at the top and bottom end surfaces, by a plurality of spacers 7 disposed in between, and by two alignment plates 9. The alignment plates 9 join at both ends with retaining plates 8 and in between with spacers 7, which join at prescribed intervals in a parallel fashion. This prescribed shape forms the framework of the battery block 3. With this framework of spacers 7, retaining plates 8, and alignment plates 9, the battery block 3 retains a plurality of parallel units 6 in a prescribed orientation, and the batteries 1 are arranged vertically and horizontally in close proximity. Finally, at one end, the alignment plate 9 is disposed between the battery block 3 and circuit board 4 and serves the additional function of section divider to isolate the circuit board 4 from the batteries 1.

Lead plates 5 connect a plurality of batteries 1, which are in a horizontal row with the same orientation, in parallel. In addition, the lead plates 5 connect the batteries 1 of vertically adjacent parallel units 6 in series. Specifically, as shown in FIGS. 4 and 5, lead plates 5 connect terminals of a plurality of batteries 1 lined up in a horizontal row as well as terminals of vertically adjacent horizontal rows of batteries 1. Lead plates 5 are planar metal plates which connect a plurality of batteries 1 arranged vertically and horizontally in a manner aligning battery terminals, which are battery end planes, in the same plane.

Lead plates 5 are formed with a size and shape that allows them to connect a plurality of batteries 1 lined up in a horizontal row in parallel as well as to connect the batteries 1 of vertically adjacent parallel units 6 in series. The horizontal length of lead plates 5 can be changed to various lengths to allow adjustment for the number of batteries 1 connected in parallel. Specifically, the horizontal length of the lead plates 5 can be lengthened to increase the number of batteries 1 connected in parallel and shortened to reduce the number of batteries 1 connected in parallel. The vertical width of the lead plates 5, which is the width of battery terminal connecting regions, is determined by the vertical width of two rows of adjacent parallel units 6. Specifically, for the case of a parallel unit formed by one horizontal row of batteries as shown in FIGS. 3-5, the vertical width of the lead plates 5 is a width that allows two batteries to be connected. For the case of a parallel unit formed by two horizontal rows of batteries as shown in FIG. 6, the vertical width of the lead plates 5 is a width that allows four batteries to be connected. The lead plates 5, shown in FIG. 3, have an overall shape which is roughly rectangular. Rectangular lead plate 5 has a horizontal length that is somewhat shorter than the overall length of a horizontal row of batteries. The vertical width is somewhat narrower than the overall width of battery rows connected together in the vertical direction. This prevents individual lead plates 5 from touching one another.

Figure 9:
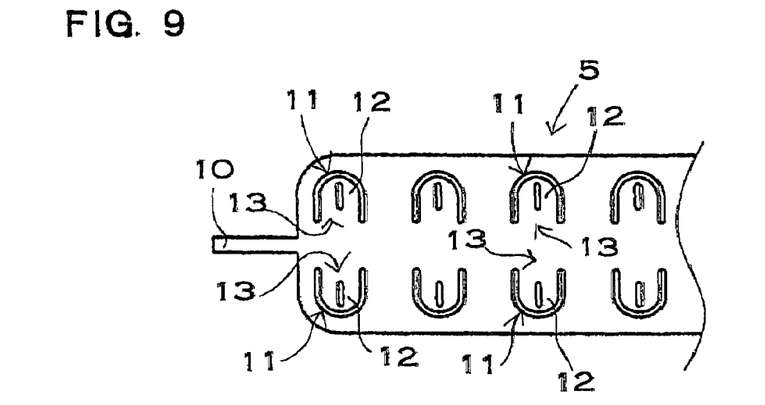
FIG. 9 is a front view of a lead plate of the battery block shown in FIG. 4.

Lead plates 5 shown in FIGS. 4 and 9 are provided with welding regions 12 for resistive welding to battery terminals. The lead plates 5 are provided with horseshoe shaped slits 11 in battery terminal connecting regions, and the areas inside the horseshoe shaped slits 11 are used as welding regions 12 to spot weld battery terminals. Since welding regions 12, delineated by the horseshoe shaped slits 11, can flex with respect to a lead plate 5, this configuration has the characteristic that battery length differences and vibration due to impact can be absorbed to effectively prevent separation of batteries 1 from the lead plates 5. However, it is not always necessary to delineate welding regions inside the horseshoe shaped slits. Welding regions may also be inside V-shaped slits or three-sided rectangular shaped slits provided in the lead plates 5. Further, in the lead plate 5 shown in FIG. 9, a plurality of horseshoe shaped slits 11 are opened with the unopened side of the horseshoe in the direction of series battery connection, or in the direction making horseshoe orientation opposite in the vertical direction. This lead plate 5 configuration has the characteristic that series-connected battery rows are connected with minimum lead plate distance, and are connected with low resistance without slit interruption to current flow.

Lead plates 5 have projections 10 that protrude from the confines of the battery block 3 in the horizontal direction. These projections 10 are provided with a width that is narrower than the width of the lead plate 5 in a manner protruding horizontally from one end of the lead plate 5. Projections 10 are brought out from the battery block 3 and connected to the circuit board 4. As shown in FIG. 4, projections 10 are inserted through openings 9A provided at the edges of the alignment plate 9 disposed at the circuit board end of the battery block 3, and extend from the confines of the battery block 3 to the circuit board 4. These projections 10 connect to the circuit board 4 as voltage detection terminals which represent intermediate voltages between series-connected batteries 1.

In the battery block 3 of FIGS. 3-5, output lead plates 5A connect the output sides of parallel units 6 disposed in the top and bottom rows to the circuit board 4. As shown in FIG. 4, output lead plates 5A are brought out and are connected to the circuit board 4 without narrowing their width. The purpose of this is to reduce output lead plate resistance and minimize loss in this part of the circuit. These output lead plates 5A are connected to output terminals for charging and discharging (not illustrated), and the battery block 3 is charged and discharged via high current through these output terminals.

The circuit board 4 is a printed circuit board with the electronic parts (not illustrated), which are needed to implement battery protection circuitry, mounted on the board. The circuit board 4 is disposed opposite one side of the battery block 3 in a manner allowing connection to the plurality of lead plate projections 10. The circuit board 4 is connected with lead plate projections 10 and output lead plates 5A to connect as a unit with the battery block 3. The circuit board 4 shown in FIG. 3 connects at its top and bottom ends with the ends of retaining plates 8 disposed at the top and bottom surfaces of the battery block 3 to fix the circuit board 4 in a specified position.

The circuit board 4 shown in FIG. 3 is disposed in parallel to a side wall of the battery block 3. A circuit board 4 disposed in this fashion at a battery block side wall and connected to the battery block 3 can have a width D, as shown in FIG. 5, which is essentially equal to the total battery length, and a length W, which is essentially equal to the sum of all the widths of the batteries 1 stacked in the vertical direction. Consequently, the width D of the circuit board 4 is determined by the length of the connected batteries 1, and the width W of the circuit board 4 is determined by the number of parallel units 6 connected in series. Specifically, the circuit board 4 does not change with the number of batteries 1 connected in parallel in each parallel unit 6. Therefore, even when the lead plates 5 are lengthened to accommodate various changes in the number of parallel connected batteries 1, the size of the circuit board 4 does not need to be changed, and an optimum number of batteries 1 can be connected in parallel to suit the battery pack application.

The circuit board protection circuitry comprises circuits such as a circuit to detect battery over-charge and over-discharge and control current, or a circuit to detect battery over-charge and cut-off current. The protection circuitry is provided with voltage detection circuits (not illustrated) to detect the voltage of parallel units 6 and determine battery over-charge or over-discharge. The voltage detection circuits detect the voltage of each parallel unit 6 via lead plate projections 10. These voltages are intermediate voltages of the battery block 3, which are used to detect battery over-charge and over-discharge. In addition, although not illustrated, the circuit board is connected to charge-discharge output terminals. With charge-discharge output terminals connected to electrically driven machinery, the battery pack discharges, and with charge-discharge output terminals connected to a battery charger, the batteries 1 are charged.

The case 2 internally houses the battery pack core 14, which is the battery block 3 and circuit board 4 connected as a unit. The case 2 is configured as a box-shaped main case 2A which houses the battery pack core 14 and a cover case (not illustrated) which closes the open side of the main case 2A. The main case 2A shown in FIG. 3 is provided with connecting ribs 15 along its outer perimeter for connection with the cover case. The cover case is also provided with connecting ribs along its perimeter, and corresponding connecting ribs 15 are connected via fasteners such as fastening bolts to join the main case 2A and cover case. However, interlocking regions can be provided on the main case and cover case to join them in an interlocking configuration, or the main case and cover case may also be joined by bonding or welding. In addition, the case shown in FIG. 3 is provided with a handle 16 allowing the battery pack to be conveniently carried.

Figure 10:
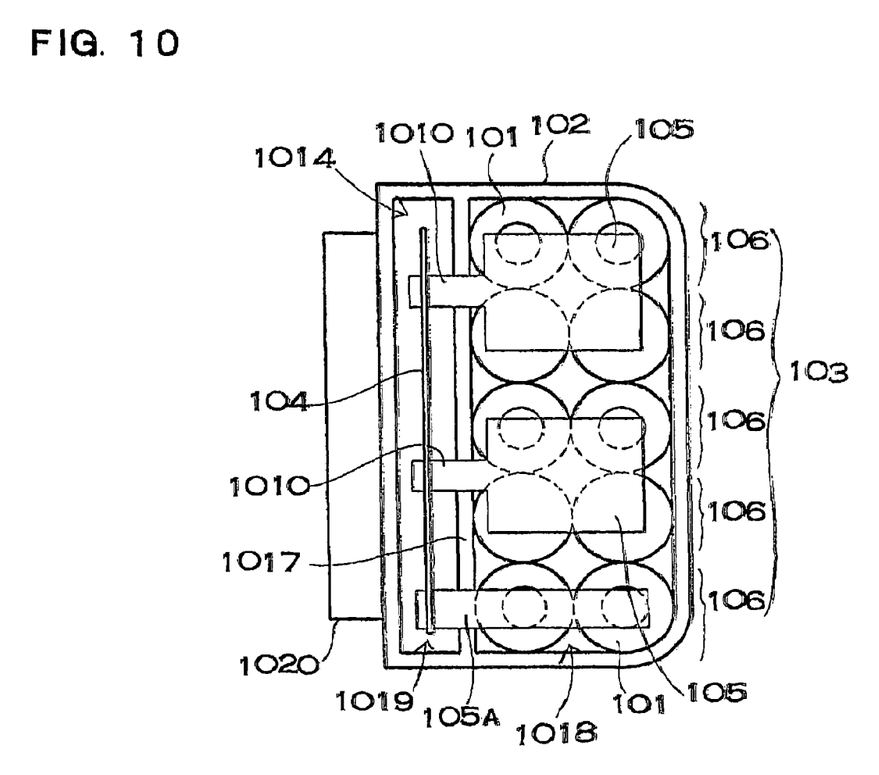
FIG. 10 is a cross-sectional view showing the internal structure of a battery pack constructed in accordance with another embodiment of the present invention.
Figure 11:
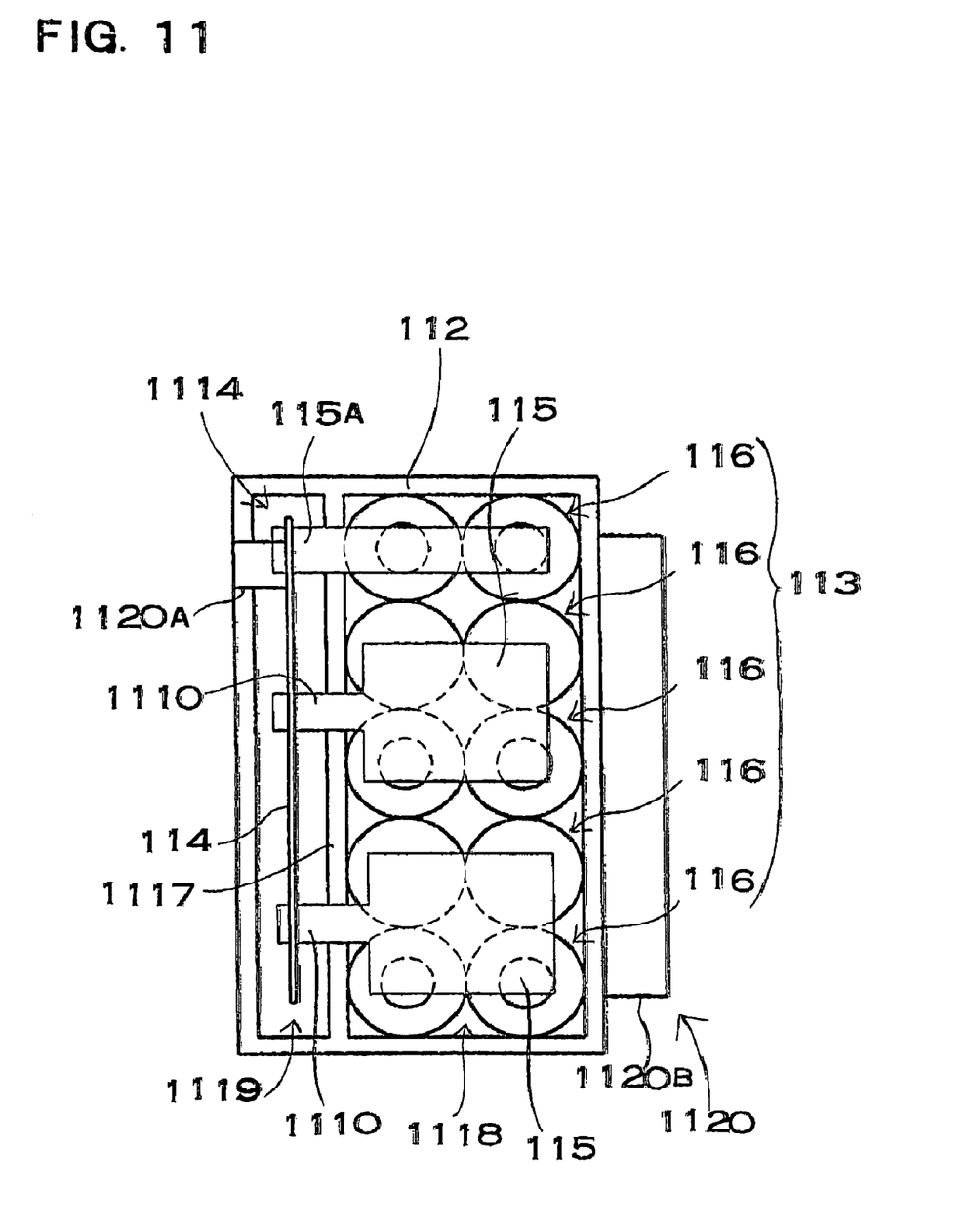
FIG. 11 is a cross-sectional view showing the internal structure of a battery pack constructed in accordance with another embodiment of the present invention.

Finally, the battery pack of the present invention may also take the configurations shown in FIGS. 10 and 11. In a battery block 103, 113 of the battery packs shown in these figures, two batteries 101, 111 are lined up in each horizontal row and five batteries 101, 111 are stacked vertically to position batteries 101, 111 at intersection points of a rectangular grid. Two batteries 101, 111 lined up in a horizontal row with the same orientation are connected to a lead plate 105, 115 to form a parallel unit 106, 116 of the battery block 103, 113. The same lead plate 105, 115 connects vertically adjacent parallel units 106, 116 in series. Lead plates 105, 115 have projections 1010, 1110 which protrude horizontally from the confines of the battery block 103, 113 and are connected to the circuit board 104, 114. Further, the parallel unit 106, positioned at the bottom row of FIG. 10 and the parallel unit 116 positioned at the top row of FIG. 11 are connected to their respective circuit boards 104, 114 via output lead plates 105A, 115A. A battery block 103, 113 and circuit board 104, 114 are joined as a unit by lead plate projections 1010, 1110 and output lead plates 105A, 115A to form a battery pack core 1014, 1114.

In the battery packs shown in FIGS. 10 and 11, a battery pack core 1014, 1114, which is a battery block 103, 113 and a circuit board 104, 114 joined as a unit, is housed in a case 102, 112. The case 102, 112 shown in these figures is provided with a dividing wall 1017, 1117 which divides the case 102, 112 into a battery holder 1018, 1118 which houses the battery block 103, 113, and a circuit board holder 1019, 1119 which houses the circuit board 104, 114. A configuration which divides the case 102, 112 into a battery holder 18 and a circuit board holder 1019, 1119 has the characteristic that it can dispose the battery block 103, 113 in accurate alignment between the dividing wall 1017, 1117 and a side wall of the case 102, 112, and it can dispose and protect the circuit board 104, 114 in the circuit board holder 1019, 1119.

The battery pack shown in FIG. 10 is provided with a connector 1020 on the side wall on the circuit board holder 1019 side of the case. This connector is a charge-discharge connector and externally exposes output terminals (not illustrated) that connect with electrically driven machinery or a battery charger. The output terminals are connected to the circuit board 104, and battery charging and discharging is controlled by protection circuitry disposed on the circuit board 104. In this battery pack, when the charge-discharge connector is connected with electrically driven machinery, electrical power output from the battery block 103 is supplied to the electrically driven machinery. When the charge-discharge connector is connected with a battery charger, batteries 101 of the battery block 103 are charged by electrical power supplied from the battery charger.

The battery pack shown in FIG. 11 is provided with connectors 1120 on the side wall on the circuit board holder side of the case, and on the side wall on the battery holder side of the case. The connector provided on the side wall on the circuit board holder side of the case is a charging connector 1120A, and the connector provided on the side wall on the battery holder side of the case is a discharging connector 1120B. These connectors 1120 are also provided with externally exposed output terminals, the output terminals are connected to the circuit board 114, and battery charging and discharging is controlled by protection circuitry disposed on the circuit board 114. In this battery pack, when the discharging connector 1120B is connected with electrically driven machinery, electrical power output from the battery block 113 is supplied to the electrically driven machinery. When the charging connector 1120A is connected with a battery charger, batteries 111 of the battery block 113 are charged by electrical power supplied from the battery charger.

In the battery packs of FIGS. 10 and 11, the circuit board 104, 114 is housed in a case 102, 112 and connectors 1020, 1120 are disposed in specified locations on the case 102, 112. However, the battery pack of the present invention may also be configured with wire leads which extend out from the case and join at their end with a connector.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on application No. 2003-287218 filed in Japan on Aug. 5, 2003, the content of which is incorporated hereinto by reference.

What is claimed is:

1. A battery pack comprising:
   a case;
   a battery block disposed in the case and including a plurality of elongated batteries positioned so as to be perpendicular to a specified surface of the case and arranged vertically and horizontally in close proximity; and
   a circuit board connected with the batteries of the battery block, wherein:
   the batteries of the battery block are lined up in a plurality of horizontal rows and the batteries in each of the horizontal rows are lined up with the same orientation with respect to terminals of the batteries,
   the battery block includes a plurality of lead plates connected to the terminals of the batteries that are lined up with the same orientation to connect them in parallel and form a plurality of parallel units, and the parallel units are stacked vertically in such a manner that the orientation of any one of the stacked parallel units is different in the vertical direction with respect to adjacent parallel units;

the lead plates, which connect the batteries of the parallel units in parallel, also connect the terminals of the batteries of at least one of the adjacent parallel units in the vertical direction to connect the at least one adjacent parallel unit in series;

each of the lead plates is non-folded and has a projection that protrudes beyond the outer periphery of the battery block, and the lead plate projections are connected with the circuit board;

the circuit board is disposed so as to oppose a side of the battery block in an orientation that allows the connections with the projections of the lead plates; and the lead plates and the projections are located in the sane plane, and the lead plate projections are connected with the circuit board so as to join the battery block and the circuit board as a single unit.

2. A battery pack as recited in claim 1, wherein the plurality of batteries that form the battery block are disposed in a fashion that puts battery end planes in a single plane at both ends of the battery block, and terminal surfaces of adjacent batteries are connected by the planar lead plates.

3. A battery pack as recited in claim 1, wherein each one of the parallel units is comprised of the plurality of batteries lined up in one horizontal row.

4. A battery pack as recited in claim 1, wherein one parallel unit comprises a plurality of the horizontal rows of batteries.

5. A battery pack as recited in claim 1, wherein the number of batteries lined up horizontally is from 2 to 20, and the number of batteries stacked vertically is from 2 to 30.

6. A battery pack as recited in claim 1, wherein the case houses a battery pack core, which is the battery block and the circuit board joined as a single unit.

7. A battery pack as recited in claim 1, wherein a connector is provided on a circuit board holder side of the battery pack.

8. A battery pack as recited in claim 1, wherein the lead plates are provided with horseshoe shaped slits in battery terminal connecting regions, and the battery terminals are spot welded inside the horseshoe shaped slits.

9. A battery pack as recited in claim 1, wherein the width of each lead plate in the battery terminal connecting regions is approximately equal to the vertical width of two rows of adjacently stacked parallel units.

10. A battery pack as recited in claim 1, wherein the circuit board is provided with voltage detection circuitry to detect parallel unit voltage.

11. A battery pack as recited in claim 1, wherein spacers are disposed in the horizontal direction between adjacent parallel units, alignment plates are disposed in the vertical direction, and the spacers and the alignment plates are joined and fixed together.

12. A battery pack as recited in claim 11, wherein the spacers comprise insulating material, and the spacers are sandwiched between parallel units and insulate the batteries of adjacently disposed parallel units.

13. A battery pack as recited in claim 12, wherein each of the spacers made of insulating material is a rectangular plastic board which is formed of plastic in a planar geometry.

14. A battery pack as recited in claim 12, wherein the overall length of one of the spacers, which is a rectangular plastic board, is longer than the overall length of a parallel unit, and both spacer end regions that extend beyond the parallel units are joined with the alignment plates.

15. A battery pack as recited in claim 11, wherein the spacers and the alignment plates are provided with coupling slits in their mutual connecting regions, and the spacers and the alignment plates are joined via these coupling slits.

16. A battery pack as recited in claim 11, wherein the spacers and the alignment plates are joined in a configuration with one inserted through the other.

17. A battery pack as recited in claim 11, wherein the battery block has retaining plates disposed at opposite end planes of the battery block in the vertical direction.

18. A battery pack as recited in claim 17, wherein the spacers are disposed in between the retaining plates, and the retaining plates are joined together by two of the alignment plates.

* * * * *